United States Patent
Liao et al.

(10) Patent No.: US 8,810,741 B2
(45) Date of Patent: Aug. 19, 2014

(54) ALIGNING AND ASSEMBLING METHOD OF STEREOSCOPIC DISPLAY DEVICE

(75) Inventors: Jian-Da Liao, Bade (TW); Chun-Ming Huang, New Taipei (TW); Huan-Ting Lee, Changhua (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 387 days.

(21) Appl. No.: 13/437,158

(22) Filed: Apr. 2, 2012

(65) Prior Publication Data

US 2013/0176525 A1    Jul. 11, 2013

(30) Foreign Application Priority Data

Jan. 10, 2012   (TW) .............................. 101100952 A (51) Int. Cl.
G02F 1/1335 (2006.01)
(52) U.S. Cl.
USPC .................................. 349/15; 349/191; 353/7
(58) Field of Classification Search
None
See application file for complete search history.

(56) References Cited

U.S. PATENT DOCUMENTS

| 7,736,005 | B2 | 6/2010 | Saishu et al. | |
| 2011/0304783 | A1* | 12/2011 | Park et al. | 349/15 |
| 2012/0194752 | A1* | 8/2012 | Lin et al. | 349/15 |

FOREIGN PATENT DOCUMENTS

| CN | 101710202 A | 5/2010 |
| CN | 102221748 A | 10/2011 |
| JP | 2008-304518 | 12/2008 |
| TW | 201030375 | 8/2010 |
| TW | 201044064 | 12/2010 |

OTHER PUBLICATIONS

English translation of abstract of TW 201044064.
English translation of abstract of TW 201030375.
English translation of abstract of JP 2008-304518.

* cited by examiner

Primary Examiner — Thanh-Nhan P Nguyen
(74) Attorney, Agent, or Firm — CKC & Partners Co., Ltd.

(57) ABSTRACT

An aligning and assembling method of a stereoscopic display device is provided and includes providing a liquid crystal (LC) panel and a brightness detector. A lenticular panel is placed between the LC panel and the brightness detector. The LC panel is driven to output a light-dispersion pattern. The lenticular panel is rotated and the brightness detector obtains a plurality of brightness patterns and a plurality of light-dispersion periods generated from the light-dispersion pattern after the light-dispersion pattern has passed through the lenticular panel. The brightness patterns correspond respectively to the light-dispersion periods. A maximum light-dispersion period is found from the light-dispersion periods. The lenticular panel is stopped to rotate when the maximum light-dispersion period is found.

10 Claims, 7 Drawing Sheets

ALIGNING AND ASSEMBLING METHOD OF STEREOSCOPIC DISPLAY DEVICE

RELATED APPLICATIONS

This application claims priority to Taiwan Application Serial Number 101100952, filed Jan. 10, 2012, which is herein incorporated by reference.

BACKGROUND

1. Technical Field

The present disclosure relates to an aligning and assembling method, and more particularly to an aligning and assembling method of a stereoscopic display device.

2. Description of Related Art

There are different types of stereoscopic display devices. For example, a stereoscopic display device may utilize a naked-eye display technique, a lenticular lens display technique, or a parallax barrier display technique. With respect to the stereoscopic display device utilizing the naked-eye display technique, such a stereoscopic display device needs to be watched in a specific viewing range to ensure 3-dimensional (3-D) display performance. That is, when users watch the stereoscopic display device utilizing the naked-eye display technique outside the specific viewing range, 3-D images displayed on the stereoscopic display device may be formed inaccurately, and moreover, the stereoscopic display device is unable to convey 3-D depth to the viewer. Therefore, stereoscopic display devices typically utilize the lenticular lens display technique or the parallax barrier display technique.

A stereoscopic display device with a lenticular lens includes a liquid crystal (LC) panel and a lenticular panel located on the LC panel. When the stereoscopic display device with a lenticular lens displays images, the lenticular panel receives images displayed from the LC panel and generates left and right viewing zones, such that users perceive 3-D depth. During manufacture, in order to ensure that the stereoscopic display device with a lenticular lens generates correct images, the relative position between the lenticular panel and the LC panel must be precise when these elements are assembled. That is, the assembly precision of the lenticular panel and the LC panel may significantly affect the 3-D image quality of the stereoscopic display device with a lenticular lens.

Figure 1:
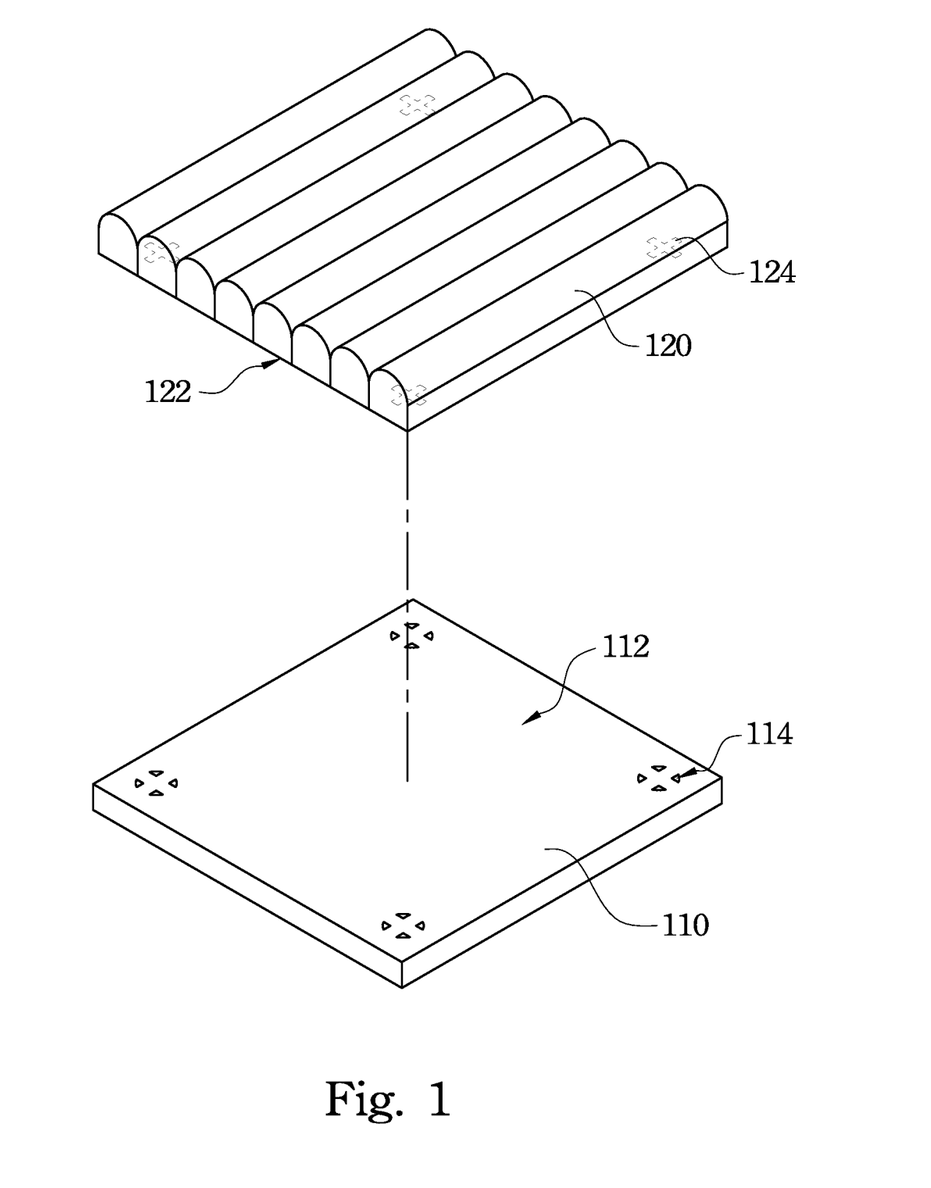
FIG. 1 is a perspective view of a conventional liquid crystal (LC) panel and a lenticular panel shown in a state prior to being assembled.
Figure 2:
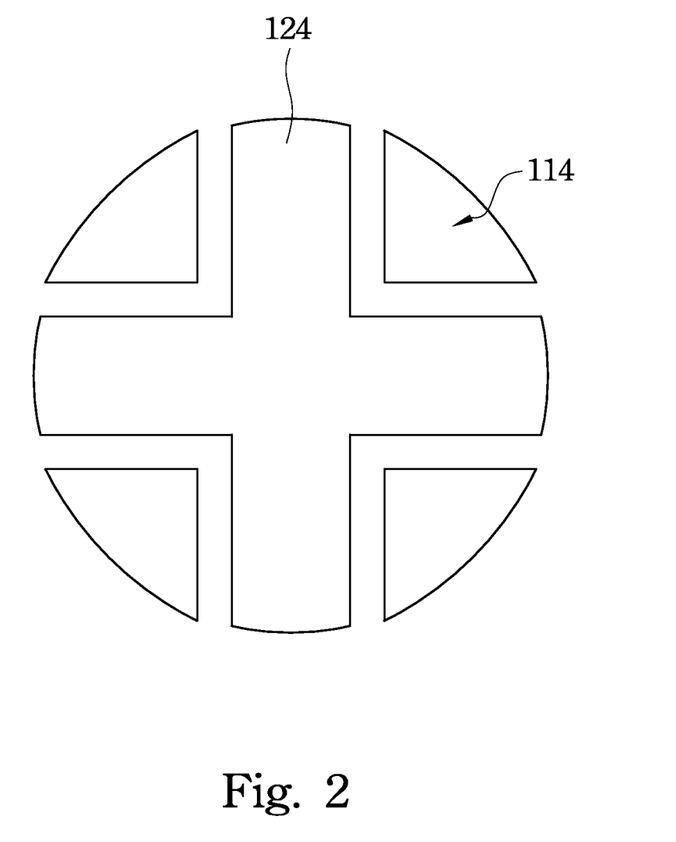
FIG. 2 is a schematic view of one of a plurality of marks of the LC panel and a corresponding one of a plurality of marks of the lenticular panel shown in FIG. 1 after the LC panel and the lenticular panel have been assembled to each other.

FIG. 1 is a perspective view of a conventional liquid crystal (LC) panel 110 and a lenticular panel 120 shown in a state prior to being assembled. FIG. 2 is a schematic view of one of a plurality of marks 114 of the LC panel 110 and a corresponding one of a plurality of marks 124 of the lenticular panel 120 shown in FIG. 1 after the LC panel 110 and the lenticular panel 120 have been assembled to each other.

As shown in FIG. 1 and FIG. 2, the marks 114 are formed on an upper surface 112 of the LC panel 110, and the marks 124 are formed on a lower surface 122 of the lenticular panel 120. The shape of the marks 114 and the shape of the marks 124 are match such that the marks 114 may be combined respectively with the marks 124. When the lenticular panel 120 is assembled to the LC panel 110, the upper surface 112 of the LC panel 110 contacts the lower surface 122 of the lenticular panel 120. Thereafter, the relative position of the LC panel 110 and the lenticular panel 120 needs to be adjusted, and this may be accomplished by ensuring that each of the marks 114 is combined with one of the marks 124, as shown in FIG. 2.

However, due to manufacturing and material differences of the LC panels 110 and the lenticular panels 120 of different stereoscopic display devices, the image quality of a stereoscopic display device with a lenticular lens cannot be controlled precisely by relying solely on an assembly method utilizing the marks 114 and the marks 124. Therefore, the image quality and the manufacturing productivity associated with the stereoscopic display device with a lenticular lens cannot be easily improved.

SUMMARY

An aspect of the present invention is to provide an aligning and assembling method of a stereoscopic display device.

In an embodiment of the present invention, an aligning and assembling method of a stereoscopic display device includes the following steps:

(a) An LC panel and a brightness detector are provided.

(b) A lenticular panel is placed between the LC panel and the brightness detector.

(c) The LC panel is driven to output a light-dispersion pattern.

(d) The lenticular panel is rotated and the brightness detector obtains a plurality of brightness patterns and a plurality of light-dispersion periods generated from the light-dispersion pattern after the light-dispersion pattern has passed through the lenticular panel. The brightness patterns correspond respectively to the light-dispersion periods.

(e) A maximum light-dispersion period is found from among all the light-dispersion periods corresponding to the brightness patterns.

(f) The lenticular panel is stopped to rotate when the maximum light-dispersion period is found.

In an embodiment of the present invention, the step (b) further includes aligning a plurality of first alignment marks of the LC panel respectively with a plurality of second alignment marks of the lenticular panel.

In an embodiment of the present invention, the shape of each of the first alignment marks and the shape of each of the second alignment marks are match such that the first alignment marks may be coupled respectively with the second alignment marks.

In an embodiment of the present invention, an angle formed between a connecting line that is between the brightness detector and a measurement point of the lenticular panel and the lenticular panel is 30 degrees or larger, such that the brightness detector measures the measurement point within a fan-shaped range.

In an embodiment of the present invention, the step (d) further includes moving the brightness detector in a direction to measure the measurement point within the fan-shaped range when rotating the lenticular panel.

In an embodiment of the present invention, the fan-shaped range is smaller than 120 degrees.

In an embodiment of the present invention, the fan-shaped range is equal to 120 degrees.

In an embodiment of the present invention, the alignment-type assembly method of stereoscopic display device further includes inputting a driving voltage to the lenticular panel for driving a plurality of liquid crystal molecules in the lenticular panel.

In an embodiment of the present invention, the driving voltage is in a range from 5 V to 20 V.

In an embodiment of the present invention, each of the brightness patterns includes a first color portion and a second color portion.

In the aforementioned embodiments of the present invention, the aligning and assembling method of a stereoscopic display device not only utilizes the first alignment marks and the second alignment marks to assemble the LC panel and the lenticular panel, but also utilizes procedures involving rotating the lenticular panel and moving the brightness detector to obtain the brightness patterns and the light-dispersion periods of the lenticular panel. Thereafter, a trend in the variation of brightness can be found by the brightness patterns. When one of the brightness patterns obtained by the brightness detector is formed by a first color portion and a second color portion, each taking up half of the brightness pattern, the maximum light-dispersion period is found. At this time, the relative position of the lenticular panel and the LC panel is the best position for assembly.

Image errors generated by manufacturing and material differences that are formed on the LC panel and the lenticular panel can be efficiently overcome through the aligning and assembling method of a stereoscopic display device of this disclosure. That is, the image quality of the stereoscopic display device with a lenticular lens can be controlled precisely by the aforementioned method. Therefore, the image quality and the manufacturing productivity associated with the stereoscopic display device with a lenticular lens are improved.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 3:
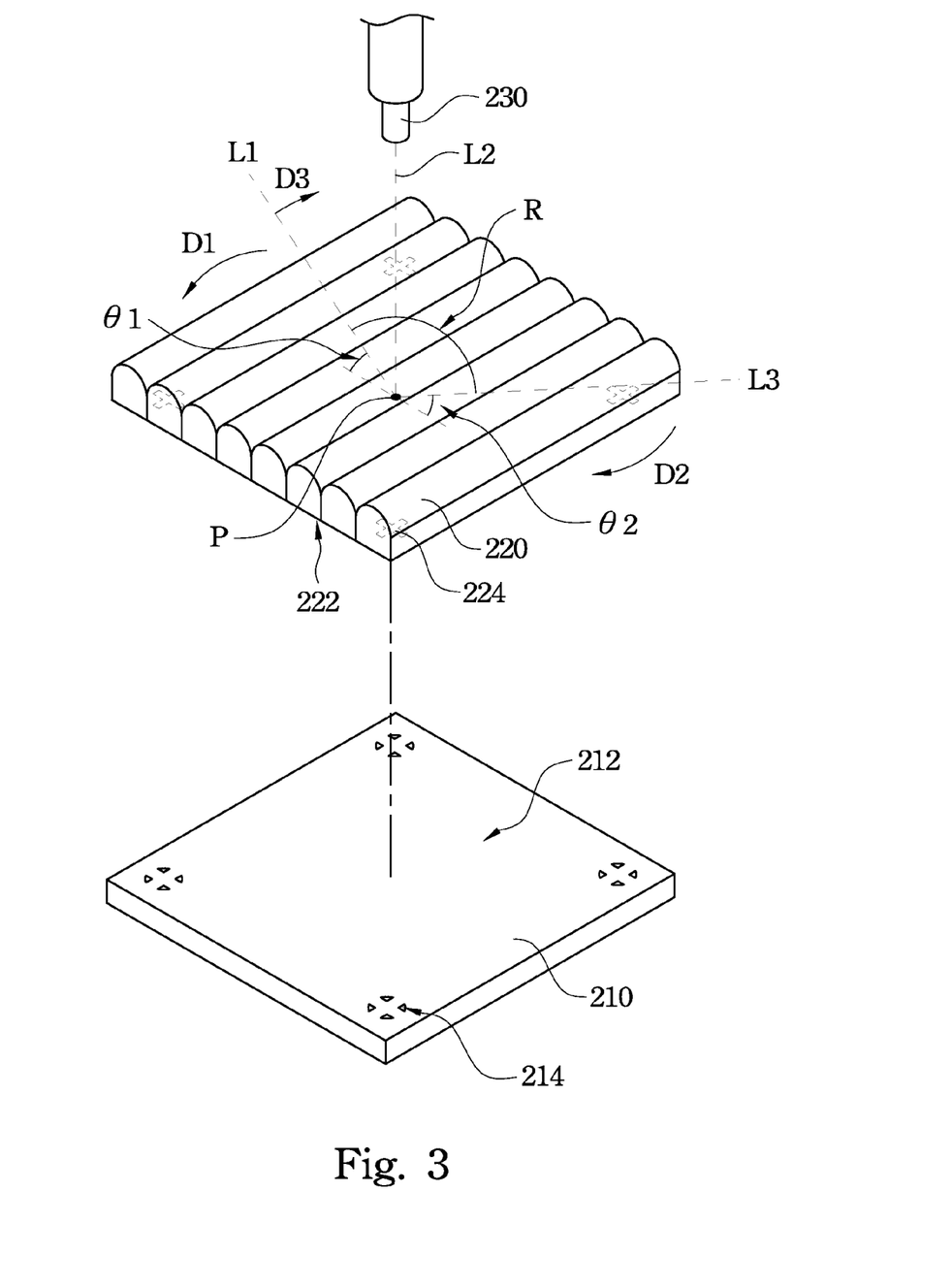
FIG. 3 is a perspective view of an LC panel and a lenticular panel of a stereoscopic display device which is used to describe an aligning and assembling method of a stereoscopic display device according to an embodiment of the present invention.
Figure 4:
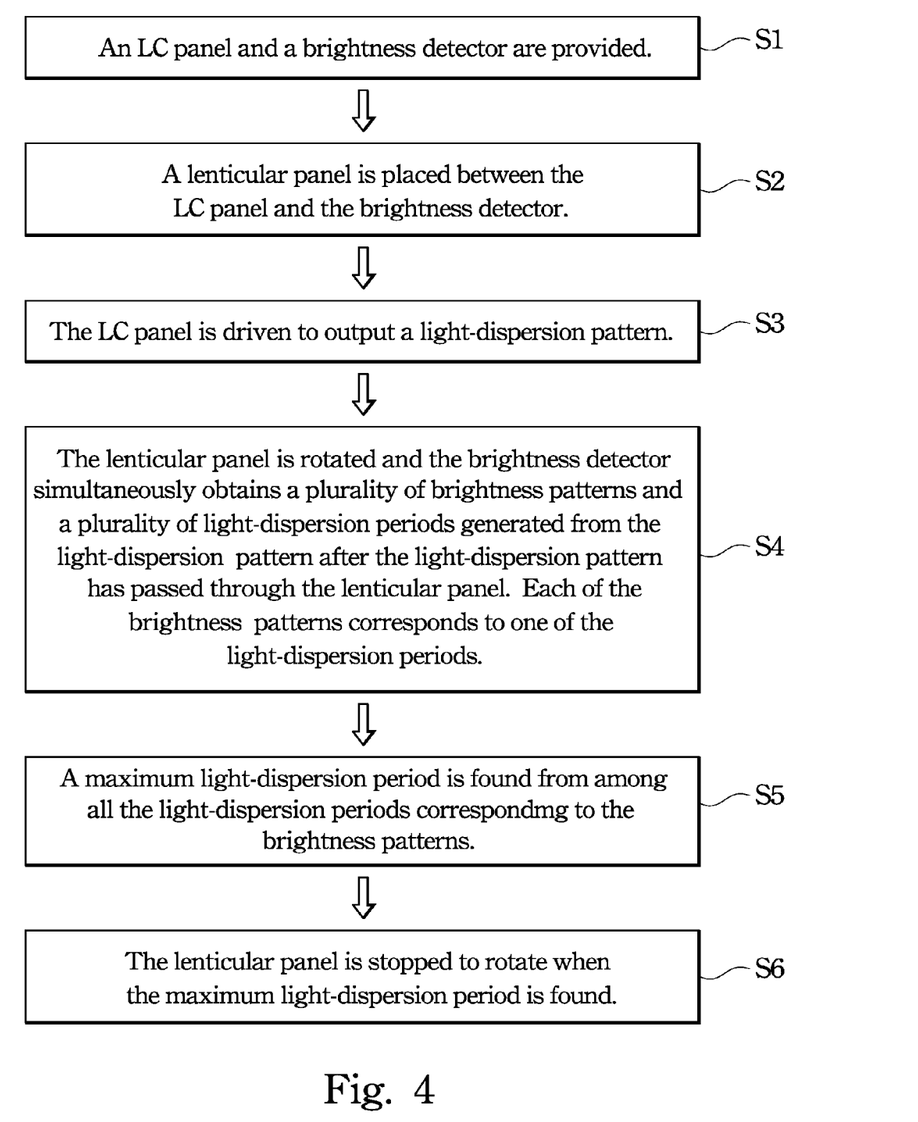
FIG. 4 is a flow chart of an aligning and assembling method of a stereoscopic display device of an embodiment of the present invention.

FIG. 3 is a perspective view of an LC panel 210 and a lenticular panel 220 of a stereoscopic display device which is used to describe an aligning and assembling method of a stereoscopic display device according to an embodiment of the present invention. FIG. 4 is a flow chart of an aligning and assembling method of a stereoscopic display device of an embodiment of the present invention. The aligning and assembling method of a stereoscopic display device includes steps that will be outlined below with reference to FIGS. 3 and 4.

In step S1, the LC panel 210 and a brightness detector 230 are provided. In step S2, the lenticular panel 220 is placed between the LC panel 210 and the brightness detector 230. In step S3, the LC panel 210 is driven to output a light-dispersion pattern. In step S4, the lenticular panel 220 is rotated and the brightness detector 230 simultaneously obtains a plurality of brightness patterns and a plurality of light-dispersion periods generated from the light-dispersion pattern after the light-dispersion pattern has passed through the lenticular panel 220. Each of the brightness patterns corresponds to one of the light-dispersion periods. In step S5, a maximum light-dispersion period is found from among all the light-dispersion periods corresponding to the brightness patterns. In step S6, the lenticular panel 220 is stopped to rotate when the maximum light-dispersion period is found.

In this embodiment, an upper surface 212 of the LC panel 210 includes a plurality of first alignment marks 214, and a lower surface 222 of the lenticular panel 220 includes a plurality of second alignment marks 224. The shape of each of the first alignment marks 214 and the shape of each of the second alignment marks 224 are match such that the first alignment marks 214 may be combined respectively with the second alignment marks 224. The light-dispersion pattern outputted by the LC panel 210 may be a red-green light-dispersion pattern, a black light-dispersion pattern, or another light-dispersion pattern which can be differentiated by left and right eyes. In addition, the lenticular panel 220 must receive an input of a driving voltage in the range of 5V to 20V to drive a plurality of liquid crystal molecules therein.

In operation, when the lenticular panel 220 is placed between the LC panel 210 and the brightness detector 230, each of the first alignment marks 214 may be substantially aligned with one of the second alignment marks 224, such that the LC panel 210 and the lenticular panel 220 are aligned. Therefore, in a following step, the lenticular panel 220 only needs to be rotated in a direction D1 or in a direction D2 to adjust the relative position between the LC panel 210 and the lenticular panel 220. Moreover, when the lenticular panel 220 is rotated in the direction D1 or in the direction D2, the brightness detector 230 can measure a measurement point P of the lenticular panel 220 simultaneously.

In this embodiment, an angle formed between a connecting line that is between the brightness detector 230 and the measurement point P of the lenticular panel 220 and the lenticular panel 220 is 30 degrees or larger, such that the brightness detector 230 measures the measurement point P within a fan-shaped range R. That is to say, each of an angle θ1 formed between a dotted line L1 and the lenticular panel 220, and an angle θ2 formed between a dotted line L3 and the lenticular panel 220 is 30 degrees or larger. Furthermore, the brightness detector 230 is moved within the fan-shaped range R, which is formed between the dotted line L1 and the dotted line L3. The fan-shaped range R is 120 degrees or smaller.

Moreover, when the lenticular panel 220 is rotated, the brightness detector 230 can simultaneously be moved in a direction D3 to measure the measurement point P from the position of the dotted line L1 to the position of the dotted line L2 and then to the position of the dotted line L3 within the fan-shaped range R. As a result, the brightness detector 230 obtains the brightness patterns and the light-dispersion periods.

It is to be noted that the aspects of the disclosure described above will not be repeated in the following description, and only aspects related to the brightness patterns and the light-dispersion periods obtained by the brightness detector 230 when utilizing the aligning and assembling method of a stereoscopic display device will be described in detail.

Figure 5:
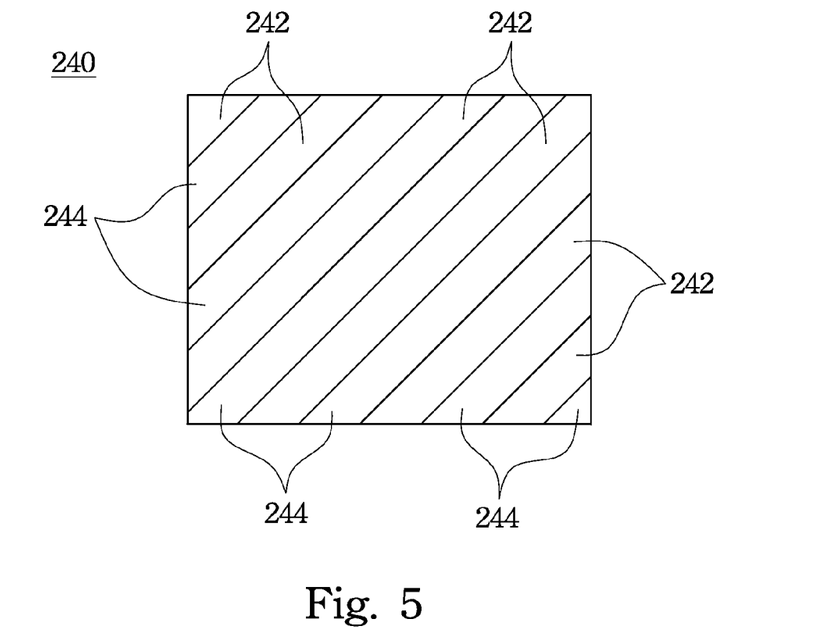
FIG. 5 is a diagram showing a brightness pattern that is obtained from a brightness detector shown in FIG. 3.

FIG. 5 is a diagram showing a brightness pattern 240 that is obtained from the brightness detector 230 shown in FIG. 3. As shown in FIG. 5, the brightness pattern 240 includes a first color portion 242 and a second color portion 244. When the light-dispersion pattern outputted by the LC panel 210 is a red-green light-dispersion pattern, the first color portion 242 is green and the second color portion 244 is red. In this embodiment, the brightness pattern 240 includes a plurality of the first color portions 242 and a plurality of the second color portions 244, in which the first color portions 242 are formed alternatingly with the second color portions 244, and the first and second color portions 242, 244 are obliquely formed in the brightness pattern 240.

Figure 6:
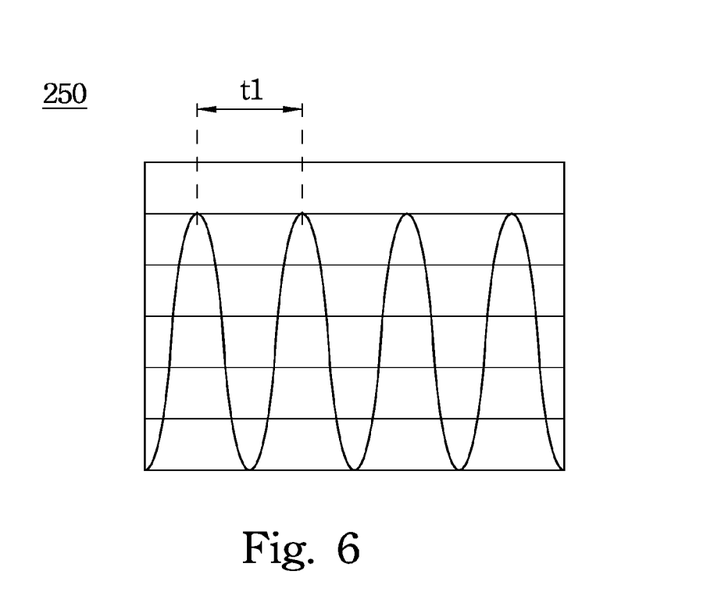
FIG. 6 is a light-dispersion period diagram corresponding to the brightness pattern shown in FIG. 5.

FIG. 6 is a light-dispersion period diagram 250 corresponding to the brightness pattern 240 shown in FIG. 5. As shown in FIG. 5 and FIG. 6, since the brightness pattern 240 includes the first color portions 242 and the second color portions 244, and the first color portions 242 and the second color portions 244 are obliquely formed in an alternating manner, the light-dispersion period t1 corresponding to the brightness pattern 240 is not the maximum light-dispersion period. Therefore, the lenticular panel 220 (see FIG. 3) may be rotated further to obtain additional brightness patterns 240 and additional light-dispersion period diagrams 250 corresponding to the brightness patterns 240, respectively.

Figure 7:
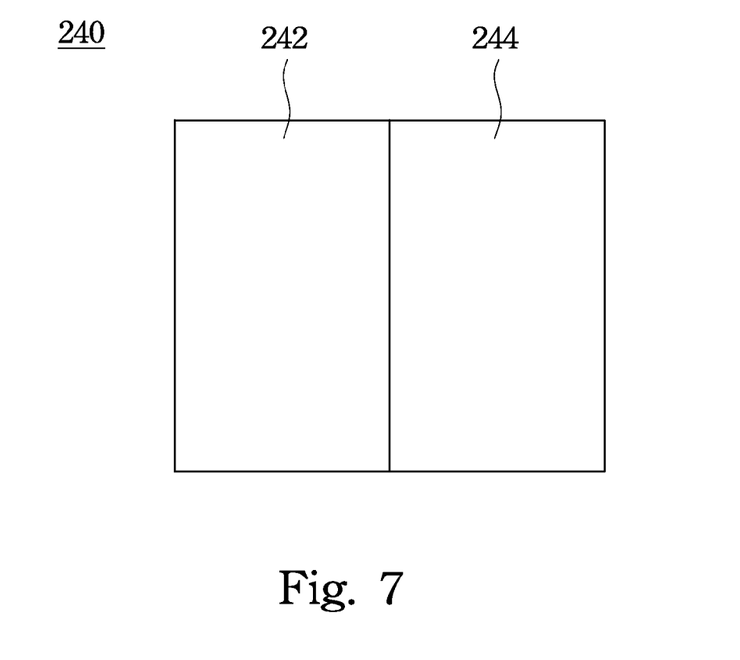
FIG. 7 is a diagram showing another brightness pattern that is obtained from the brightness detector shown in FIG. 3.

FIG. 7 is a diagram showing another brightness pattern 240 that is obtained from the brightness detector 230 shown in FIG. 3. As shown in FIG. 7, half of the brightness pattern 240 is formed by the first color portion 242 and other half of the brightness pattern 240 is formed by the second color portion 244. In this embodiment, the brightness pattern 240 includes the single first color portion 242 and the single second color portion 244, and the first color portion 242 and the second color portion 244 are formed in a side-by-side manner.

Figure 8:
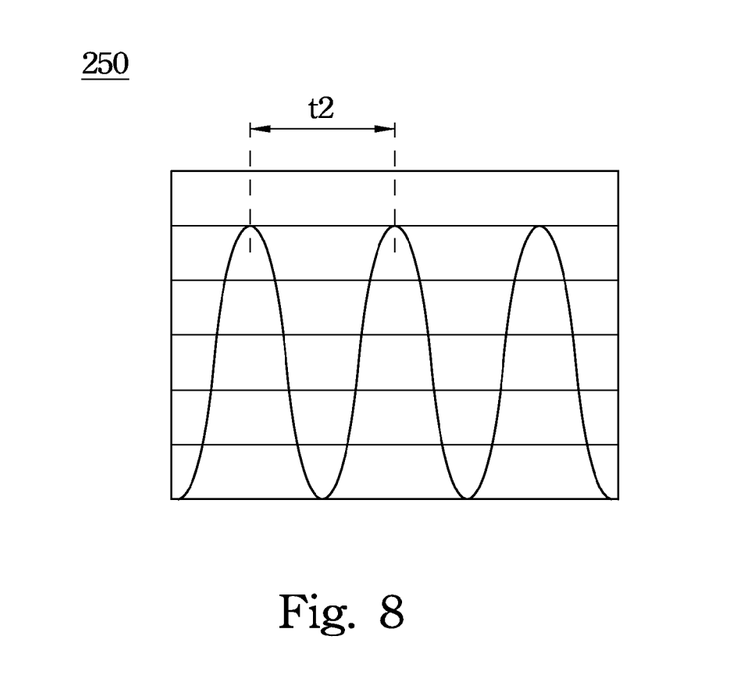
FIG. 8 is a light-dispersion period diagram corresponding to the brightness pattern shown in FIG. 7.

FIG. 8 is a light-dispersion period diagram 250 corresponding to the brightness pattern 240 shown in FIG. 7. As shown in FIG. 7 and FIG. 8, since the brightness pattern 240 includes the single first color portion 242 and the single second color portion 244, and the first color portion 242 and the second color portion 244 are formed in a side-by-side manner, as described above, the light-dispersion period t2 corresponding to the brightness pattern 240 is the maximum light-dispersion period. However, in order to assure the accuracy of the maximum light-dispersion period, the lenticular panel 220 (see FIG. 3) may be rotated further to obtain additional brightness patterns 240 and additional light-dispersion period diagrams 250 corresponding to the brightness patterns 240, respectively.

Figure 9:
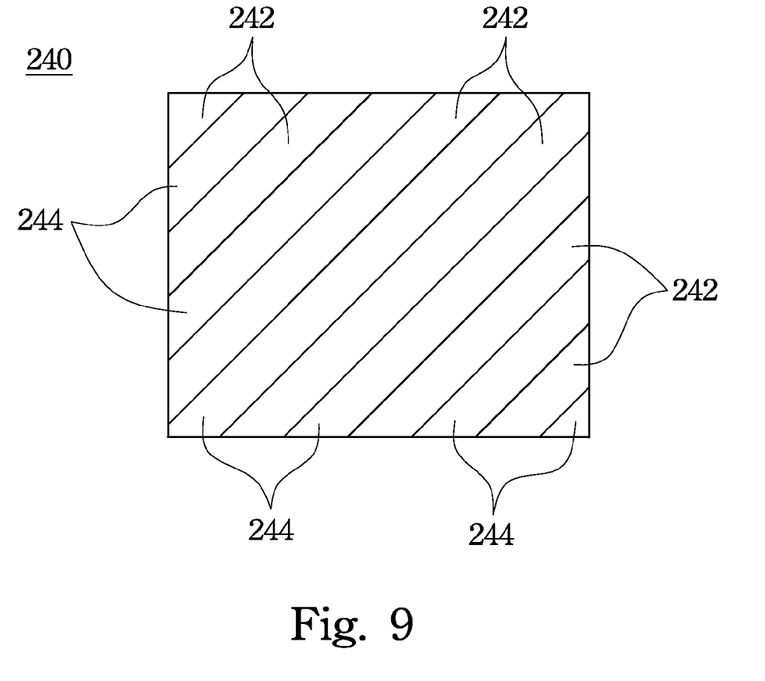
FIG. 9 is a diagram showing another brightness pattern that is obtained from the brightness detector shown in FIG. 3.

FIG. 9 is a diagram showing another brightness pattern 240 that is obtained from the brightness detector 230 shown in FIG. 3. As shown in FIG. 9, the brightness pattern 240 includes the first color portions 242 and the second color portions 244, and the first color portions 242 and the second color portions 244 are obliquely formed in an alternating manner.

Figure 10:
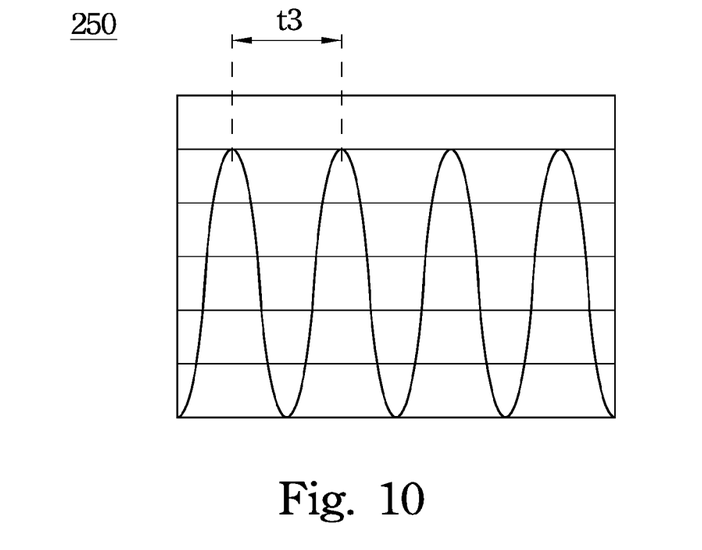
FIG. 10 is a light-dispersion period diagram corresponding to the brightness pattern shown in FIG. 9.

FIG. 10 is a light-dispersion period diagram 250 corresponding to the brightness pattern 240 shown in FIG. 9. As shown in FIG. 9 and FIG. 10, since the brightness pattern 240 includes the first color portions 242 and the second color portions 244, and the first color portions 242 and the second color portions 244 are obliquely formed in an alternating manner, the light-dispersion period t3 corresponding to the brightness pattern 240 is not the maximum light-dispersion period.

Referring back to FIG. 3, when the lenticular panel 220 is rotated, the brightness patterns 240 of FIG. 5, FIG. 7, and FIG. 9 may be obtained. As a result, a trend in the variation of brightness can be found by these brightness patterns 240. For example, when the lenticular panel 220 is rotated in the direction D1, the sequence of the brightness patterns 240 is FIG. 5, FIG. 7, and FIG. 9. This indicates that the lenticular panel 220 has been rotated past an ideal point, so that the lenticular panel 220 needs to be rotated in a direction opposite to the direction D1 (i.e., the direction D2). As a result, the brightness pattern 240 shown in FIG. 9 would change to the brightness pattern 240 shown in FIG. 7. When the brightness pattern 240 shown in FIG. 7 is formed, the light-dispersion period t2 corresponding to the brightness pattern 240 shown in FIG. 7 is the maximum light-dispersion period. When the maximum light-dispersion period t2 is found, the lenticular panel 220 can be stopped to rotate. At this moment, the relative position of the lenticular panel 220 and the LC panel 210 is the best position for assembly.

In other embodiments, the number of times that the brightness patterns 240 and the light-dispersion period diagrams 250 are obtained by the brightness detector 230 may depend on practical requirements, and is not limited to three times.

Compared with a conventional assembly method, image errors generated by process and material differences that are formed on the LC panel and the lenticular panel can be efficiently overcome through the aligning and assembling method of a stereoscopic display device of this disclosure. That is, the image quality of the stereoscopic display device with a lenticular lens can be controlled precisely by the aforementioned method. Therefore, the image quality and the manufacturing productivity associated with the stereoscopic display device with a lenticular lens are improved.

What is claimed is:

1. An aligning and assembling method of a stereoscopic display device comprising the steps of:
    (a) providing a liquid crystal (LC) panel and a brightness detector;
    (b) placing a lenticular panel between the LC panel and the brightness detector;
    (c) driving the LC panel to output a light-dispersion pattern;
    (d) rotating the lenticular panel and obtaining a plurality of brightness patterns and a plurality of light-dispersion periods generated from the light-dispersion pattern after the light-dispersion pattern has passed through the lenticular panel by the brightness detector, wherein each of the brightness patterns corresponds to one of the light-dispersion periods;
    (e) finding a maximum light-dispersion period from among all the light-dispersion periods corresponding to the brightness patterns; and
    (f) stopping rotation of the lenticular panel when finding the maximum light-dispersion period.

2. The aligning and assembling method of a stereoscopic display device as claimed in claim 1, wherein the step (b) further comprises:
    aligning each of a plurality of first alignment marks of the LC panel with one of a plurality of second alignment marks of the lenticular panel.

3. The aligning and assembling method of a stereoscopic display device as claimed in claim 2, wherein the shape of each of the first alignment marks and the shape of each of the second alignment marks are match such that the first alignment marks are coupled respectively with the second alignment marks.

4. The aligning and assembling method of a stereoscopic display device as claimed in claim 1, wherein an angle formed between a connecting line that is between the brightness detector and a measurement point of the lenticular panel and the lenticular panel is 30 degrees or larger, such that the brightness detector measures the measurement point within a fan-shaped range.

5. The aligning and assembling method of a stereoscopic display device as claimed in claim 4, wherein the step (d) further comprises:
   moving the brightness detector in a direction to measure the measurement point within the fan-shaped range when rotating the lenticular panel.

6. The aligning and assembling method of a stereoscopic display device as claimed in claim 4, wherein the fan-shaped range is smaller than 120 degrees.

7. The aligning and assembling method of a stereoscopic display device as claimed in claim 4, wherein the fan-shaped range is equal to 120 degrees.

8. The aligning and assembling method of a stereoscopic display device as claimed in claim 1, further comprising:
   inputting a driving voltage to the lenticular panel for driving a plurality of liquid crystal molecules in the lenticular panel.

9. The aligning and assembling method of a stereoscopic display device as claimed in claim 8, wherein the driving voltage is in a range of 5 V to 20 V.

10. The aligning and assembling method of a stereoscopic display device as claimed in claim 1, wherein each of the brightness patterns comprises a first color portion and a second color portion.

\* \* \* \* \*